(12) United States Patent
Machida et al.

(10) Patent No.: US 8,944,903 B2
(45) Date of Patent: Feb. 3, 2015

(54) GAME PROVIDING DEVICE AND SYSTEM FOR PROVIDING A GAME INCLUDING A MOVING OBJECT ALONG A PATH

(71) Applicant: DeNA Co., Ltd., Tokyo (JP)

(72) Inventors: Yuki Machida, Tokyo (JP); Ryosuke Abe, Tokyo (JP); Seiichiro Sumiyoshi, Tokyo (JP); Hikaru Baba, Tokyo (JP); Yudai Moteki, Tokyo (JP); Shinya Kasahara, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 0 days.

(21) Appl. No.: 14/258,608

(22) Filed: Apr. 22, 2014

(65) Prior Publication Data

US 2014/0370985 A1    Dec. 18, 2014

(30) Foreign Application Priority Data

Jun. 18, 2013 (JP) .................. 2013-127143

(51) Int. Cl.
*A63F 13/55* (2014.01)
*A63F 13/00* (2014.01)
*A63F 3/00* (2006.01)

(52) U.S. Cl.
CPC ............ *A63F 13/005* (2013.01); *A63F 3/00* (2013.01)
USPC .......... 463/15; 463/1; 463/9; 463/40; 463/41; 463/42

(58) Field of Classification Search
USPC ...................................... 463/9, 15
See application file for complete search history.

(56) References Cited

U.S. PATENT DOCUMENTS

2007/0142108 A1*  6/2007  Linard et al. .................... 463/22

FOREIGN PATENT DOCUMENTS

| JP | 2001-000739 A | 1/2001 |
| JP | 2006-102123 A | 4/2006 |
| JP | 2011-189073 A | 9/2011 |

OTHER PUBLICATIONS odino, "Amida", Dec. 1, 2006, gamefaqs, <http://www.gamefaqs.com/gameboy/574768-amida/faqs/45956>.*
Konami, "Amidar", 1981, <http://www.arcade-museum.com/game_detail.php?game_id=6883>.*
Japanese Patent Application No. 2013-127143, Office Action dated Sep. 3, 2013.
Japanese Patent Application No. 2013-127143, Decision to Grant Patent, dated Dec. 3, 2013.

* cited by examiner

*Primary Examiner* — Justin Myhr
(74) *Attorney, Agent, or Firm* — Procopio, Cory, Haregreaves & Savitch LLP

(57) ABSTRACT

A system according to an embodiment includes a game progress control unit configured to control progress of a game, a screen output unit configured to output a game screen containing a path area in which a path of a puzzle game is formed to a terminal device, a placement unit configured to place a path object that functions as part of the path on the basis of advancement of turns in the path area according to an instruction from the player, a moving unit configured to advance the turns to move the moving object according to a predetermined rule, and a determination unit configured to determine whether the moving object has reached a goal point.

13 Claims, 4 Drawing Sheets

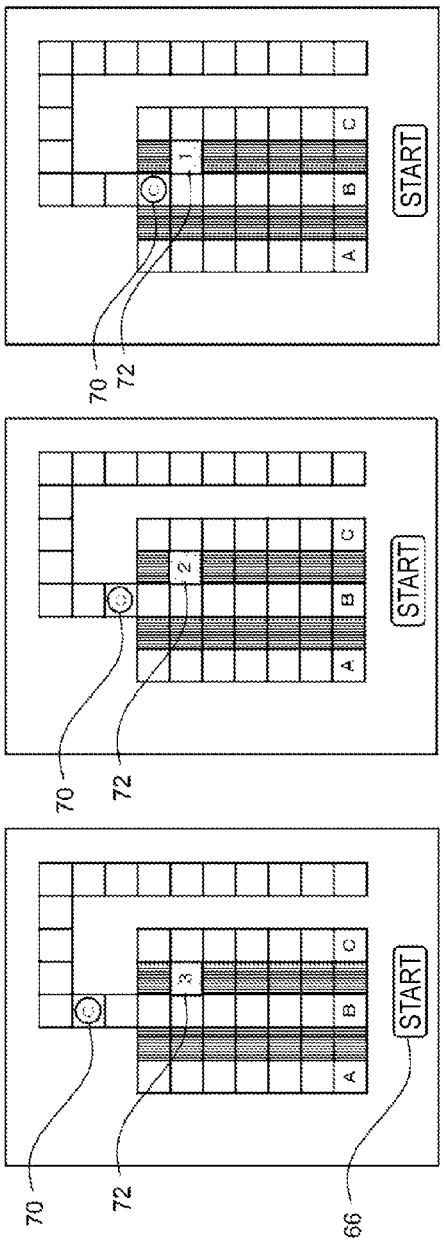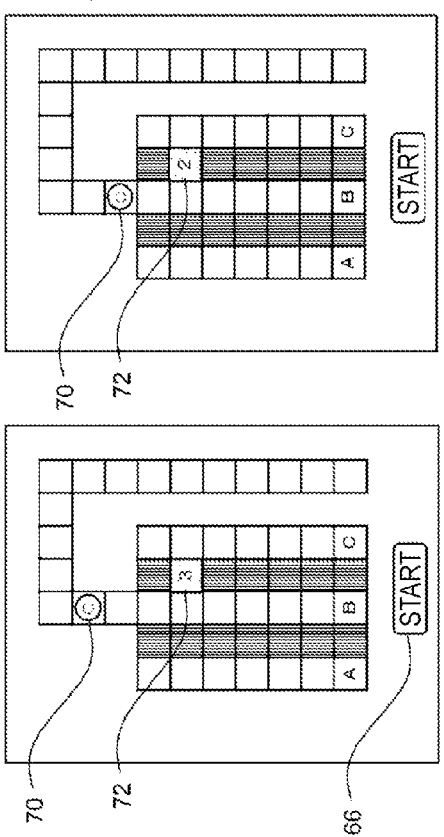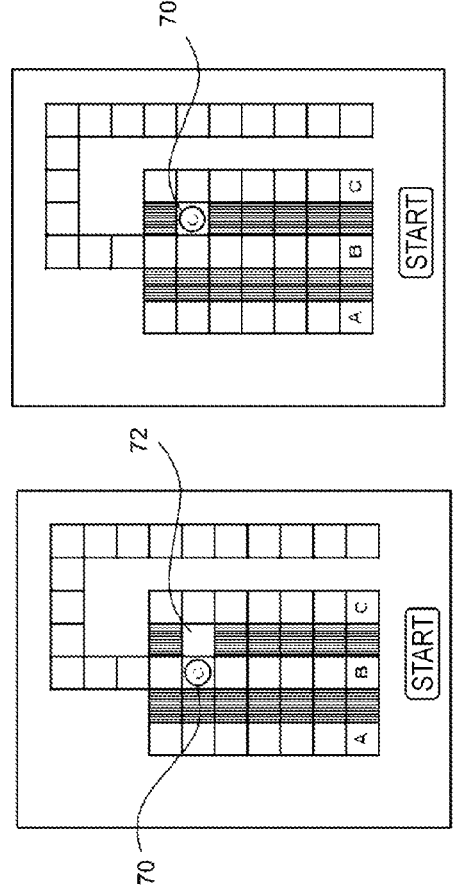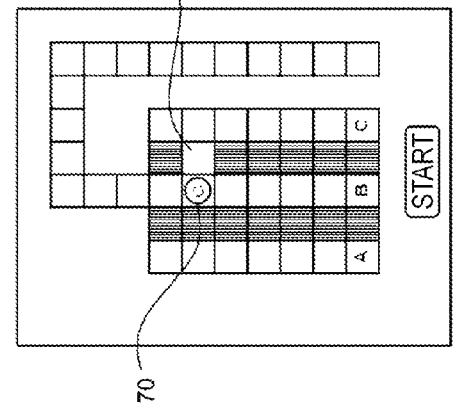

GAME PROVIDING DEVICE AND SYSTEM FOR PROVIDING A GAME INCLUDING A MOVING OBJECT ALONG A PATH

BACKGROUND OF THE INVENTION

1. Field of the Invention

The present invention relates to a game providing device, a system, and a non-transitory computer-readable storage medium storing a program. More particularly, the present invention relates to a game providing device, a system, and a non-transitory computer-readable storage medium storing a program that provide a player with a game in which a moving object moving along a path according to a predetermined rule is to be brought to a goal.

2. Description of Related Art

In related art, examples of known games provided by this type of devices include a game in which a player forms a path of water pipes by connecting the pipes to guide water flowing therethrough to an outlet, and a game using a rule for ghost leg lotteries. For example, for a game using the rule for ghost leg lotteries, a configuration allowing a player to set horizontal lines of a ghost leg lottery so that an object moving from a start point will reach a goal point is provided (for example, refer to JP 2001-000739 A).

SUMMARY OF THE INVENTION

Such a game, however, requires quick and appropriate actions on a moving object such as flowing water (for example, actions of connecting pipes or actions of setting horizontal lines of a ghost leg lottery), which allows players to enjoy thrilling game elements but does not provide sufficient game elements of solving puzzles by using their brains that puzzle games originally have. It is desirable to provide a game requiring a player to further use his/her brain among games in which a moving object is to be brought to a goal.

One of the objects of the embodiments of the present invention is to provide a game requiring a player to further use his/her brain among games in which an object moving along a path is to be brought to a goal. Other objects of the present invention will be apparent by referring to the entire specification.

A game providing device according to an embodiment of the present invention is a game providing device that provides a player with a game in which a moving object moving along a path according to a predetermined rule is to be brought to a goal point, including: one or more processors configured to execute a predetermined program, wherein the program includes: a screen output module configured to output a game screen containing a path area in which the path is formed; a placement module configured to place a path object that functions as part of the path on the basis of advancement of a time unit into the path area according to an instruction from the player; a moving module configured to advance the time unit to move the moving object along the path according to the predetermined rule; and a determination module configured to determine whether the moving object has reached the goal point. Note that examples of the "time unit" can include a real unit of time (a second, for example), as well as units indicating temporal stages used in a game (a turn, a step, an action, for example).

A game providing device according to an embodiment of the present invention is a game providing device that provides a player with a game in which a moving object moving along a path according to a predetermined rule is to be brought to a goal point, including: a screen output unit configured to output a game screen containing a path area in which the path is formed; a placement unit configured to place a path object that functions as part of the path on the basis of advancement of a time unit into the path area according to an instruction from the player; a moving unit configured to advance the time unit to move the moving object along the path according to the predetermined rule; and a determination unit configured to determine whether the moving object has reached the goal point.

A system according to an embodiment of the present invention is a system that provides a player operating a terminal device connected via a communication network with a game in which a moving object moving along a path according to a predetermined rule is to be brought to a goal point, including: one or more processors configured to execute a predetermined program, wherein the program includes: a screen output module configured to output a game screen containing a path area in which the path is formed to the terminal device; a placement module configured to place a path object that functions as part of the path on the basis of advancement of a time unit into the path area according to an instruction from the player operating the terminal device; a moving module configured to advance the time unit to move the moving object along the path according to the predetermined rule; and a determination module configured to determine whether the moving object has reached the goal point.

According to an embodiment of the present invention, a non-transitory computer-readable storage medium stores a program causing a computer to function as a game providing device that provides a player with a game in which a moving object moving along a path according to a predetermined rule is to be brought to a goal point, including: a screen output module configured to output a game screen containing a path area in which the path is formed; a placement module configured to place a path object that functions as part of the path on the basis of advancement of a time unit into the path area according to an instruction from the player; a moving module configured to advance the time unit to move the moving object along the path according to the predetermined rule; and a determination module configured to determine whether the moving object has reached the goal point.

According to various embodiments of the present invention, it is possible to provide a game requiring a player to further use his/her brain among games in which an object moving along a path is to be brought to a goal.

BRIEF DESCRIPTION OF THE DRAWINGS

FIGS. 4A to 4E are explanatory diagrams illustrating advancement of turns on the game screen according to an embodiment.

DETAILED DESCRIPTION OF THE INVENTION

Figure 1:
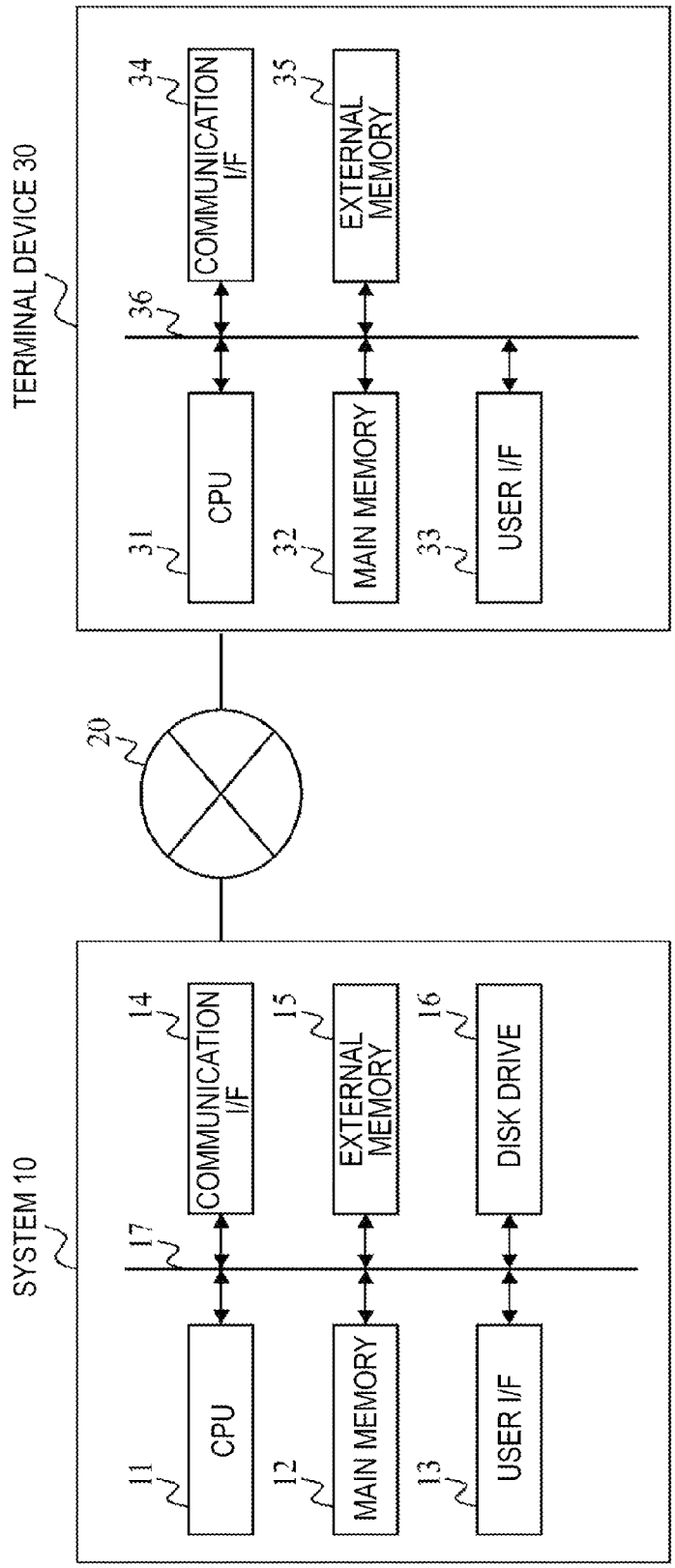
FIG. 1 is a block diagram schematically a network configuration of a system according to an embodiment of the present invention.

FIG. 1 is a block diagram schematically illustrating a system including a system 10 according to an embodiment of the present invention. As illustrated in FIG. 1, the system 10 according to the embodiment is connected to and can communicate with a terminal device 30 via a communication network 20 such as the Internet, and provides games to a player that operates the terminal device 30. Note that terminal devices, which are not illustrated, other than the terminal device 30 may also be connected to and capable of communication with the system 10.

As illustrated, the system 10 includes a CPU (processor) 11, a main memory 12, a user interface (I/F) 13, a communication I/F 14, an external memory 15, and a disk drive 16. These components are electrically connected to one another via a bus 17. The CPU 11 loads an operating system and various programs for controlling progress of online games onto the main memory 12 from the external memory 15, and executes instructions contained in the loaded programs. The main memory 12 is used to store the programs to be executed by the CPU 11. The main memory 12 is a DRAM, for example.

The user I/F 13 includes an information input device such as a keyboard and a mouse that receives operator input, and an information output device such as a liquid crystal display that outputs computation results from the CPU 11, for example. The communication I/F 14 is implemented in hardware, firmware, or communication software such as a TCP/IP driver and a PPP driver, or a combination thereof, and can communicate with the terminal device 30 via the communication network 20.

The external memory 15 is a magnetic disk drive, for example, and is configured to store various programs such as control programs for controlling progress of online games. The external memory 15 may also store various data used in games. The data that can be stored in the external memory 15 may alternatively be stored in a database server that is connected to and can communicate with the system 10 but is physically separate from the system 10. The disk drive 16 reads data stored in various storage media such as a CD-ROM, a DVD-ROM, and a DVD-R, and writes data thereinto. For example, data such as game applications and game data stored in storage media are read by the disk drive 16 and installed on the external memory 15.

In one embodiment, the system 10 is a web server that manages a website including multiple web pages in a hierarchical structure, and can provide the terminal device 30 with game services. The terminal device 30 can acquire HTML data for displaying the web pages, analyze the acquired HTML data, and present the web pages to a user (a player of a game) of the terminal device 30. Games provided through such web pages are also referred to as browser games. The external memory 15 also stores the HTML data for displaying the web pages. The HTML data are composed of HTML documents written in a markup language such as the HTML and associated with various images. The HTML documents may also have embedded therein programs written in a scripting language or the like such as ActionScript or JavaScript (registered trademarks).

The external memory 15 may also store game applications to be executed in an execution environment other than browser software in the terminal device 30. The game applications can contain game programs for executing games and various data such as image data referred to during execution of the game programs. The game programs are written in an object-oriented programming language such as Objective-C or Java (registered trademarks). The written game programs are stored together with various data in a form of application software into the external memory 15. The application software stored in the external memory 15 is delivered to the terminal device 30 in response to a delivery request. At the terminal device 30, the application software delivered from the system 10 is received via a communication I/F 34 under control of a CPU 31, and the received game programs are sent to and stored in an external memory 35. The application software is started according to player's operation of the terminal device 30, and executed on a platform such as NgCore (trademark) or Android (trademark) on the terminal device 30. The system 10 provides various data necessary for advancing a game to a game application running on the terminal device 30. The system 10 can also store various data transmitted from the terminal device 30 for each player to manage progress of games for each player.

The system 10 can thus advance a game by managing a website that provides a game service and delivering web pages constituting the website in response to requests from the terminal device 30. The system 10 can also advance a game on the basis of communication with a game application running on the terminal device 30 alternatively to or in addition to such a browser game. The system 10 can store data necessary for advancing a game for each piece of identification information identifying each player in whichever manner the game is provided. Although details will not be described, the system 10 can also have functions of performing a process of authenticating a player at the start of a game and a billing process caused in the course of a game. The system 10 provides any games including action games, role playing games, real-time baseball games, card games, and puzzle games. The types of games realized by websites or game applications of the system 10 are not limited to those stated herein.

In one embodiment, the terminal device 30 is any information processing device that displays web pages of a website for a game acquired from the system 10 on a web browser and has an application execution environment for executing game applications.

As illustrated, the terminal device 30 includes the CPU (processor) 31, a main memory 32, a user I/F 33, the communication I/F 34, and the external memory 35. These components are electrically connected to one another via a bus 36.

The CPU 31 loads various programs such as an operating system from the external memory 35 onto the main memory 32, and executes instructions contained in the loaded programs. The main memory 32 is used to store the programs to be executed by the CPU 31. The main memory 32 is a DRAM, for example.

The user I/F 33 includes an information input device that receives user input, and an information output device that outputs computation results from the CPU 31, for example, including a display device such as a liquid crystal display with a touch panel.

The communication I/F 34 is implemented in hardware, firmware, or communication software such as a TCP/IP driver and a PPP driver, or a combination thereof, and can communicate with the system 10 via the communication network 20.

The external memory 35 is a magnetic disk drive or flash memory, for example, and stores various programs such as an operating system. In receipt of a game application from the system 10 via the communication I/F 34, the external memory 35 also stores the received game application.

The terminal device 30 having such architecture includes browser software for interpreting files in the HTML format (HTML data) for screen display. The functions of the browser software allow interpretation of HTML data acquired from the system 10 and display of web pages corresponding to the received HTML data. The terminal device 30 also includes plug-in software (such as Flash Player provided by Adobe Systems Incorporated) embedded in the browser software, capable of acquiring files in the SWF format embedded in HTML data from the system 10 and executing the files in the SWF format by using the browser software and the plug-in software.

When a game is executed in the terminal device 30, an animation or an icon for operation, for example, instructed by a program is displayed on a screen of the terminal device 30. The player can input instructions for advancing the game by using an input interface of the terminal device 30. Instructions input by the player are transferred to the system 10 through the functions of a browser and a platform such as NgCore (trademark).

Figure 2:
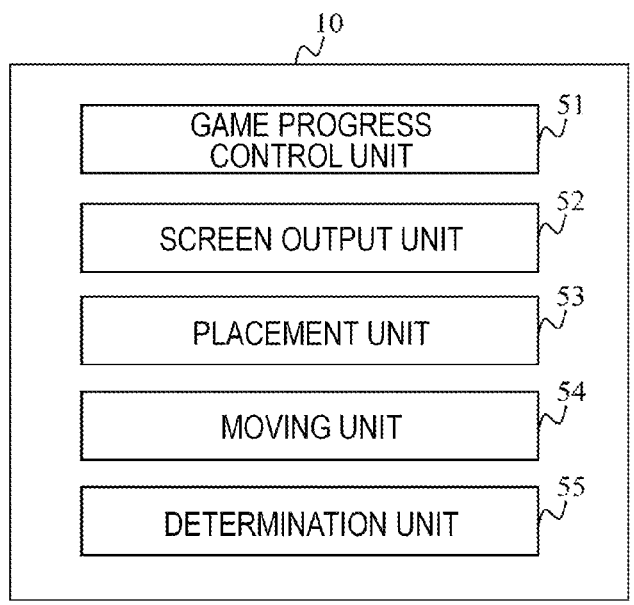
FIG. 2 is a block diagram illustrating a functional configuration of a system according to an embodiment.

Next, functions of the system 10 implemented by the components illustrated in FIG. 1 will be described. While the system 10 can provide various games as described above, the description will be made focusing on functions relating to a puzzle game in which a game's goal is to make a moving object moving along a path reach a goal point as an example suitable for describing an embodiment of the present invention. FIG. 2 is a block diagram illustrating functions of the system 10 according to an embodiment of the present invention. As illustrated, the system 10 includes a game progress control unit 51 configured to control progress of a game, a screen output unit 52 configured to output a game screen containing a path area in which a path of the puzzle game is generated to the terminal device 30, a placement unit 53 configured to place a path object that functions as a part of the path into the path area according to an instruction from the player on the basis of advancement of turns (units of time), a moving unit 54 configured to advance the turns and move the moving object along the path according to a predetermined rule, and a determination unit 55 configured to determine whether the moving object has reached the goal point. The functions are implemented by operation of the CPU 11 and various programs and tables stored in the main memory 12 and the external memory 15 of the system 10 in cooperation, and implemented by executing programs including at least part of modules corresponding to the functions of the game progress control unit 51, the screen output unit 52, the placement unit 53, the moving unit 54, and the determination unit 55 by the CPU 11 that is a processor. Furthermore, the functions can be implemented by making the CPU 31 execute at least part of the modules corresponding to the functions of the game progress control unit 51, the screen output unit 52, the placement unit 53, the moving unit 54, and the determination unit 55 on a browser or a game application of the terminal device 30.

The game progress control unit 51 can control progress of a game by transmitting/receiving various data necessary for advancing the game to/from the terminal device 30, and managing the data for each player. For example, the game progress control unit 51 sequentially displays web pages constituting a website providing a game service on the terminal device 30 in response to requests from the terminal device 30. When a hyperlink on a displayed web page is selected by the player, the game progress control unit 51 transmits new HTML data associated with the hyperlink to the terminal device 30. At the terminal device 30, a web page based on the new HTML data is displayed. Since web pages stored in the system 10 are sequentially provided to the terminal device 30 by the game progress control unit 51 in response to player operation in this manner, the player can advance the game on the basis of his/her operation through the functions of the game progress control unit 51. The game progress for each player managed by the game progress control unit 51 can include information on the number of cleared stages, scores and the like in a puzzle game, which can be used to display the number of cleared stages, a ranking of scores, and the like on the terminal device 30. Furthermore, the game progress control unit 51 can also allow communication (such as informing other players that a certain stage is cleared) between players using SNS functions.

When a game application is executed on the terminal device 30, the game progress control unit 51 can transmit various data used in the game to the game application. For example, upon receiving a control signal indicating that a given stage is cleared from the game application on the terminal device 30, the game progress control unit 51 provides various parameters relating to a stage next to the cleared stage to the game application. The game application can load the data provided from the system 10 to advance the game.

The terminal device 30 can transmit information relating to progress of a game such as information indicating various parameters used in the game (information on the number of acquired game points, acquired items, etc.) and information indicating the status (information identifying cleared stages, etc.) to the system 10 where necessary by using the functions of browser software and game applications. The game progress control unit 51 can control progress of a game for each player by storing the information relating to the game received by multiple terminal devices 30 for each player. As a result, when a player logs in the system 10 by using his/her ID, the system can resume the game from a stage according to the player's progress on the basis of the information on the game progress held in association with the player by the system 10. Information necessary for advancing a game may also be managed by various functions of the system 10 in addition to the game progress control unit 51.

Figure 3:
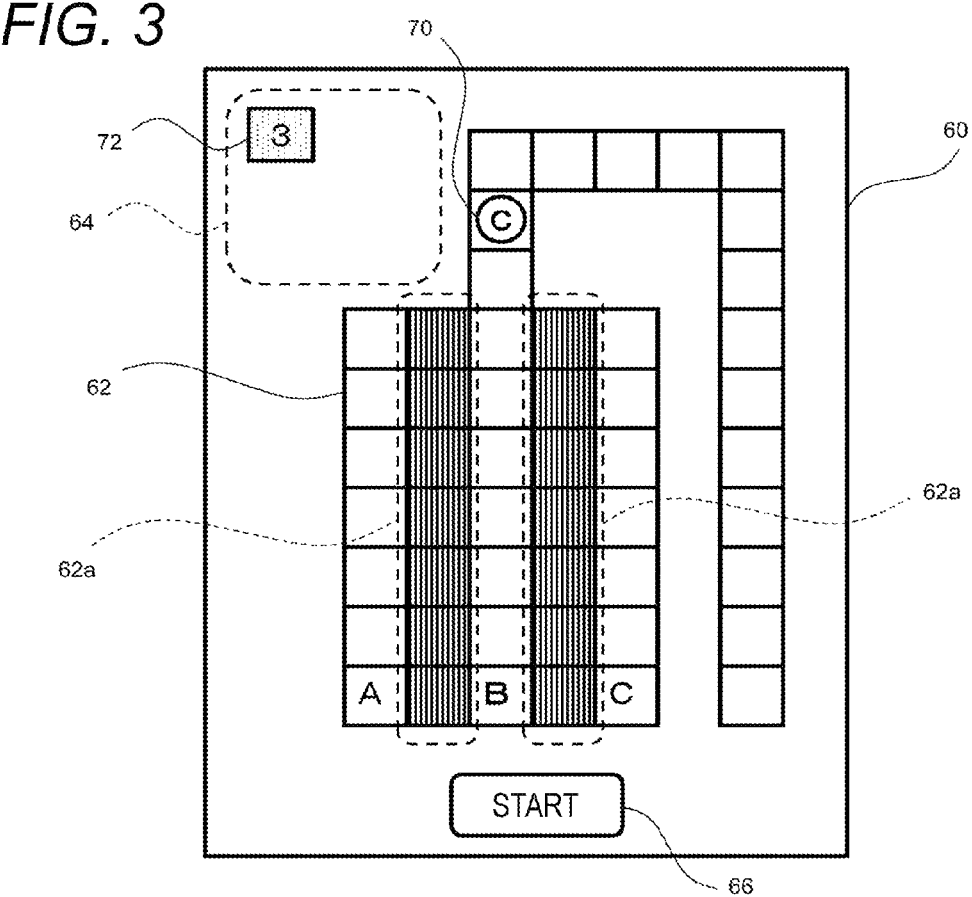
FIG. 3 is an explanatory diagram illustrating an example of a game screen according to an embodiment.

Next, operation of the system 10 thus configured according to one embodiment of the present invention will be described. FIG. 3 is an explanatory diagram illustrating an example of a game screen 60 that is a screen for a puzzle game output (transmitted) by the screen output unit 52 to the terminal device 30 and displayed on the terminal device 30. The game screen 60 exemplifies one of multiple stages included in the puzzle game according to the embodiment, and is a screen resulting from transition from a main screen of the puzzle game according to selection of a stage by the player operating the terminal device 30, for example. Note that the main screen of the puzzle game is displayed on the terminal device 30 when the player operating the terminal device 30 requests the system 10 to display a web page for playing the puzzle game or when an application of the puzzle game is executed on the terminal device 30.

As illustrated in FIG. 3, the game screen 60 (a stage of the puzzle game) in the embodiment includes a path area 62 in the center of the screen, a path object display area 64 in the upper-left corner of the screen, and a start button 66 for the player to instruct to start advancement of a turn in the center at the bottom of the screen. The path area 62 is constituted by multiple squares and, in one embodiment, includes a path constituted by squares represented by white squares in FIG. 3 and a path object placement areas 62a constituted by squares represented by vertical stripes in FIG. 3 in which a path object 72, which will be described later, can be placed. In the example of FIG. 3, the path formed in the path area 62 is formed in three vertical lines (first path elements) each of which is constituted by vertically successive squares (seven squares in this example) and between which two path object placement areas 62a lie. The central vertical line of the three vertical lines extends longer upward than the other two vertical lines (by three squares in this example), and then extends rightward and then downward (by four squares rightward and nine squares downward). The extended part forms a shape of the number "7". The three vertical lines connect an upper starting point (in the central vertical line, an end point from which the shape of "7" extends) and a lower ending point. The ending point is set to the goal point for the moving object. In one embodiment, the goal point for the moving object is set depending on the type of the moving object. In the example of FIG. 3, the ending points of the three vertical lines are set to the goal point when the type of the moving object is "A", the goal point when the type of the moving object is "B", and the goal point when the type of the moving object is "C", respectively, in this order from left to right. In addition, a moving object 70 is placed in advance on a square that is the start point for the moving object 70 on the path in the path area 62. Note that the start point for the moving object 70 placed in advance can be any position (square) on the path in the path area 62 depending on the stage.

In the path object display area 64 of the game screen 60, one or more path objects 72 that can be placed by the player are displayed. A path object 72 functions as part of the path based on the advancement of turns (units of time). In one embodiment, a path object 72 functions as part of the path when the required number (predetermined number) of turns set for the path object have advanced. The required number of turns is displayed on the path object 72 in the path object display are 64 so that the player can recognize the number. The player can select a path object 72 displayed in the path object display area 64, and then select a desired square from the squares constituting the path object placement areas 62a in the path area 62 so as to place the path object 72 at a desired position in the path object placement areas 62a. Note that the process of placing the path object 72 in the path object placement areas 62a in response to a player's instruction is realized by the functions of the placement unit 53 of the system 10.

Here, a rule under which the moving object 70 moves along the path in a puzzle game according to one embodiment will be described. In the puzzle game according to the embodiment, the moving object 70 moves toward the ending point of the three vertical lines according to the rule of the "ghost leg lottery. Thus, when a path object 72 placed in the path object placement areas 62a functions as part of the path as a result of advancement of the required number of turns, the path object 72 functions as a horizontal line (second path element) of a ghost leg lottery connecting two of the three vertical lines. The moving object 70 moves by one square each time one turn advances. Thus, the player needs to place a path object 72 that functions as a horizontal line of the ghost leg lottery according to advancement of turns at an appropriate position so that the moving object 70 moving also according to advancement of turns will reach the goal point. For example, in the example of FIG. 3, since the type of the moving object 70 is "C", the moving object 70 needs to be made to reach the ending point of the right vertical line set as the goal point when the type of moving object is "C". The moving object 70, however, will reach the ending point of the central vertical line (the goal point when the type of the moving object is "B") if the moving object 70 goes on. The path object 72 thus needs to be placed at an appropriate position in the path object placement areas 62a so as to make the moving object 70 reach the ending point of the right vertical line.

FIGS. 4A to 4E are explanatory diagrams illustrating states in which a path object 72 is placed in the path object placement area 62a by the player and in which turns advance thereafter in the game screen exemplified in FIG. 3. In this example, as illustrated in FIG. 4A, the path object 72 is placed on a square in the path object placement area 62a between the second squares from the top of the central and right vertical lines. Subsequently, when the player selects the start button 66, advancement of turns is started. In one embodiment, once advancement of turns is started, the player cannot place path objects 72 in the path object placement areas 62a any more even if there remain path objects 72 that can be placed. Note that, configuration may alternatively such that the path object 72 can be placed in the path object placement areas 62a even after advancement of turns is started. Still alternatively, configuration may be such that a path object 72 that is once placed can be cancelled or replaced at another position after advancement of turns is started.

FIG. 4B illustrates the game screen 60 in a state in which one turn has advanced from the state of FIG. 4A. As illustrated, when one turn advances, the moving object 70 moves downward by one square and the displayed required number of turns of the path object 72 is decremented by one (3→2). Note that the decreasing required number of turns for a path object 72 placed in the path object placement areas 62a need not necessarily be displayed. As illustrated in FIG. 4C, when another one turn advances, the moving object 70 further moves downward by one square and the displayed required number of turns for the path object 72 is further decremented by one (2→1). As illustrated in FIG. 4D, when another one turn advances, the moving object 70 further moves downward by one square, and the required number of turns for the path object 72 is decremented by one and becomes "0" (the total number of turns after advancement of turns is started reaches the required number of turns (three turns) set in advance for the path object 72). Then, the path object 72 functions as part of the path, more specifically, as a horizontal line of the ghost leg lottery. Thus, as illustrated in FIG. 4E, when another one turn advances, the moving object 70 moves toward the right vertical line along the path object 72 functioning as the horizontal line. Although not illustrated, the moving object 70 then moves downward along the right vertical line until it reaches the goal point. Since the ending point of the right vertical line is set to the goal point for the type of the moving object "C" and the type of the moving object 70 in this example is "C", the player has achieved the game goal (cleared the stage). Note that the process of advancing turns to move the moving object 70 is realized by the functions of the moving unit 54 of the system 10. The process of determining whether or not the moving object 70 has reached the goal point is realized by the determination unit 55 of the system 10. In response to the determination result, an image or an animation indicating that the game goal is achieved (or that the game goal could not be achieved) is displayed on the game screen 60 or another screen. When the game goal is achieved, the player can move to a next stage.

Figure 5:
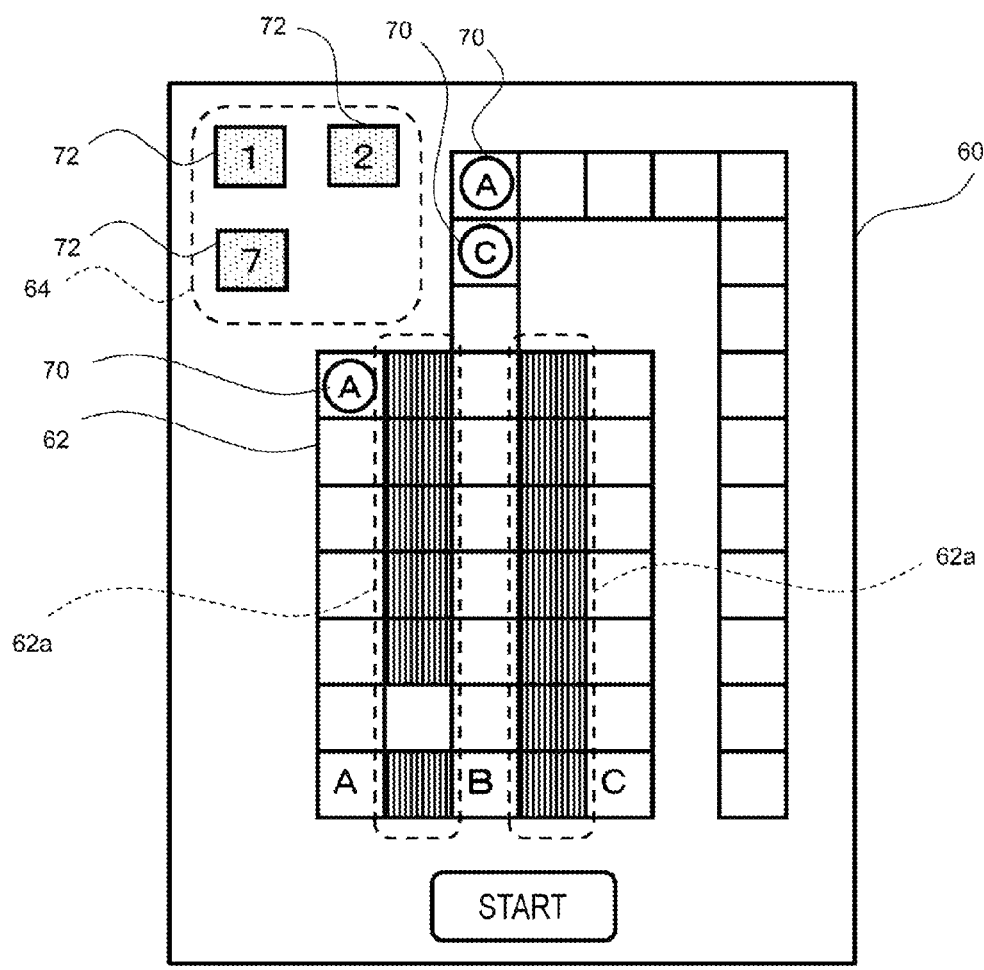
FIG. 5 is an explanatory diagram illustrating an example of the game screen according to an embodiment.

FIG. 5 is an explanatory diagram illustrating an example of the game screen 60 presenting a stage different from that in the example FIG. 3 of the puzzle game according to an embodiment. The stage illustrated in FIG. 5 is higher in difficulty than the stage illustrated in FIG. 5. Specifically, as illustrated, three moving objects 70 are first placed in advance on a path in the path area 62, in which different types ("A" and "C") of moving objects 70 are mixed. As a result of placing multiple moving objects 70 of different types, the moving objects 70 need to be made to reach different goal points, which makes the puzzle game more difficult and requires further use of the user's brain. Furthermore, in the example of FIG. 5, three path objects 72 are displayed in the path object display area 64, for which different required number of turns ("1", "2" and "7") are set. As a result of allowing placement of multiple path object 72 for which different required number of turns are set in this manner, variation in the placement into the path object placement area 62a is increased, which makes the puzzle game more difficult and requires further use of the user's brain. Furthermore, a stage may be configured such that a game goal can be achieved by using only some of multiple path objects 72 that can be placed. As illustrated in FIG. 5, note that a path (a horizontal line of a ghost leg lottery) may be set in advance in the path object placement area 62*a* (in the example of FIG. 5, a path is set in advance in the path object placement area 62*a* between the second squares from the bottom of the left and the central vertical lines). Needless to say, stages of a puzzle game provided by the system 10 according to the embodiment are not limited to those illustrated in FIGS. 3 and 5. For example, the number of vertical lines may be increased and the lengths of the vertical lines may be shorter or longer according to the difficulty of a stage. Furthermore, the units by which the moving object 70 moves and the units by which the path is formed (the units of the path objects) may be smaller than the squares illustrated in FIGS. 3 and 5, and a turn may correspond to the unit of real time (one second, for example) so that advancement of turns is equated to the lapse of real time.

The puzzle game provided by the system 10 according to the embodiment illustrated in FIGS. 3 and 5 can be realized with dramatic effects using various images and animations. For example, a dramatic effect that various types of automobiles (moving objects 70) move along a road (path) to reach a garage (goal point) can be produced. In this case, a path object placement area 62*a* can be displayed as a river and a path (horizontal line of a ghost leg lottery) formed by a path object 72 can be displayed as a bridge for crossing the river, for example. Furthermore, in this case, a dramatic effect that the path object 72 is displayed as an image or an animation indicating that the bridge is under construction until the required number of turns have advanced and as a bridge after the number of turns advanced can be produced.

Furthermore, the puzzle game provided by the system 10 according to the embodiment illustrated in FIGS. 3 and 5 can be realized with operability of various terminal devices 30. For example, in a case where a terminal device 30 includes an acceleration sensor, placement of a path object 72 into a path object placement area 62*a* can be cancelled when the acceleration sensor detects a swing of the terminal device 30 made by the player. Furthermore, the number of turns until a path object 72 placed in a path object placement area 62*a* functions as part of the path can be increased or decreased when predetermined touch operation on the path object 72 is made by the player (that is, advancement of turns is delayed or accelerated for the path object 72 on which the predetermined touch operation is made).

In a game in which a moving object 70 moving along a path is brought to a goal point, the system 10 according to the embodiments of the present invention described above places a path object 72 that functions as part of the path on the basis of advancement of turns (units of time) in a path object placement area 62*a* in the path area 62 according to an instruction from the player, advances the turns to move the moving object 70 along the path according to the rule of the ghost leg lottery (predetermined rule), and determines whether the moving object 70 reached the goal point. Thus, since the player needs to place the path object 72 that function as part of the path on the basis of advancement of turns at an appropriate position so that the moving object 70 also moving according to advancement of turns will reach the goal point, further use of brain is required. As a result, the player can enjoy the game elements (game elements of solving a puzzle) that cannot be enjoyed in similar games of the related art.

With the system 10 according to the embodiments, the player selects a path object 72 for which the required number of turns is set in advance and places the selected path object 72 in a path object placement area 62*a*. The required number of turns set for a path object 72, however, may be specified by the player. For example, the upper limit of the sum of the required numbers of turns for one or more path objects 72 to be placed in path object placement areas 62 may be defined in advance, and values specified by the player within the upper limit may be set as the required number of turns for placement of the path objects 72. In this case, the upper limit of the sum of the required numbers of turns (or information that can identify the upper limit) may be displayed on the game screen 60 so as to be recognized by the player.

The system 10 according to the embodiments is configured to start advancement of turns when the player selects the start button 66 on the game screen 60. The manner in which advancement of turns is started, however, is not limited thereto. For example, advancement of turns may be started whether or not the player has instructed to start. Specifically, advancement of turns may be started immediately after displaying the game screen 60 (a stage of a puzzle game), or a predetermined period (10 seconds, for example) after the game screen 60 is displayed. In this case, it is preferable that a path object 72 can be placed in a path object placement area 62*a* according to a player's instruction even after advancement of turns is started. In this manner, the player can also enjoy thrilling game elements.

While the system 10 according to the embodiments is configured to move the moving object 70 by one square each time one turn advances, the number of squares by which a moving object moves each time one turn advances may be different depending on the type of the moving object (that is, the moving speed may be different depending on the type of the moving object). In this manner, the difficulty of the puzzle game increases, and the player is required to further use his/her brain.

While a path object 72 functions as a horizontal line of a ghost leg lottery on the basis of advancement of turns in the system 10 according to the embodiments, the manner in which a path object 72 functions as part of the path is not limited thereto. For example, when a path object 72 functions as part of the path, a moving object 70 (for example, a standard-sized vehicle) that can pass therethrough and a moving object 70 (for example, a heavy vehicle) that cannot pass therethrough may be set. Furthermore, a path object 72 that functions as part of the path as a result of advancement of turns may cease to function as part of the path thereafter. For example, a path made by a path object 72 may cease to function as part of the path after a moving object 70 passes therethrough (a path object 72 may cease to function as part of the path only after a specific type of moving object 70 passes therethrough). Alternatively, the number of turns during which a path object 72 functions as part of the path may be determined in advance so that the path object 72 ceases to function as part of the path when the predetermined number of turns advance.

While a goal of a game is to make a moving object 70 reach a goal point in the system 10 according to the embodiments, an additional game goal that the moving object 70 passes through a predetermined point may further be provided. In this case, the point to pass through may be displayed in the path area 62 on the game screen 60, and after advancing turns by the functions of the moving unit 54 of the system 10, whether the moving object 70 has passed through the predetermined point may be determined by the functions of the determination unit 55 in addition to whether the moving object 70 has reached the goal point.

With the system 10 according to the embodiments, a path is formed by vertical lines and horizontal lines and a moving object 70 is moved according to the rule of the ghost leg lottery. The manner in which a moving object 70 moving along a path to according to a predetermined rule is brought to a goal point, however, is not limited thereto. For example, a game, which may be referred to as a water pipe game, of making a moving object 70 reach a goal point while forming a path by the player can be provided according to an embodiment of the present invention. In this case, for example only the moving object 70 and the goal point may be displayed in the path area 62 on the game screen 60 without forming the path before starting advancement of turns, and the player may place an object that functions as part of the path on the basis of advancement of turns corresponding to the path object 72 displayed in an area corresponding to the path object display area 64 into the path area 62 after starting advancement of turns, so as to make the moving object 70 reach the goal point.

While the system 10 that provides a game to the player operating the terminal device 30 connected thereto and capable of communication therewith via the communication network 20 is described in the embodiments, a terminal device alone like the terminal device 30 (including a smart phone, a tablet terminal, a game terminal, etc.), for example, can also function as a game providing device according to an embodiment of the present invention. Specifically, a terminal device configured to implement the functions exemplified in FIG. 2 by cooperation of a CPU and various programs, tables, and the like stored in a main memory and an external memory can function alone as a game providing device according to an embodiment of the present invention. Operation of the thus configured terminal device that functions as the game providing device is the same as that of the system 10 according to the embodiments described above, and detailed description thereof will not be repeated.

The processes and procedures described herein are realized by software, hardware, or a combination thereof in addition to those explicitly described in the embodiments. More specifically, the processes and procedures described herein are realized by implementing logic corresponding to the processes in media such as an integrated circuit, a volatile memory, a nonvolatile memory, a magnetic disk, and an optical storage. Furthermore, the processes and procedures described herein can be implemented in the form of computer programs that are executed by various computers.

Even if processes and procedures described herein are explained to be implemented by a single device, software element, component, or module, such processes and procedures can be implemented by multiple devices, software elements, components, and/or modules. Furthermore, even if data, tables, and databases described herein are explained to be stored in a single memory, such data, tables, and databases can be distributed and stored in multiple memories included in a single device or distributed in multiple devices. Moreover, software and hardware elements described herein may be integrated into a smaller number of elements or divided into a larger number of elements.

Even if a component of the invention is described in either of a singular form and a plural form or in a form not defined whether it is singular or plural, the component may be either in a singular form or in a plural form unless the context requires otherwise.

What is claimed is:

1. A game providing device that provides a player with a game in which a moving object moving along a path according to a predetermined rule is to be brought to a goal point, the game providing device comprising:
 one or more processors configured to execute a predetermined program, wherein
 the program includes:
  a screen output module configured to output a game screen containing a path area in which the path is formed;
  a placement module configured to place a path object that functions as part of the path on the basis of advancement of a time unit into the path area according to an instruction from the player;
  a moving module configured to advance the time unit to move the moving object along the path according to the predetermined rule; and
  a determination module configured to determine whether the moving object has reached the goal point, and
 the path object functions as part of the path when a predetermined number of time units advance.

2. The game providing device according to claim 1, wherein the placement module places multiple path objects, for which different predetermined numbers of time units are set, according to instructions from the player.

3. The game providing device according to claim 1, wherein
 the screen output module outputs the game screen containing, in addition to the path area, one or more path objects that can be placed by the player, and
 the placement module places a path object selected by the player from the one or more path objects that can be placed contained in the game screen at a position in the path area specified by the player.

4. The game providing device according to claim 1, wherein
 the screen output module outputs the game screen containing, in addition to the path area, information that can specify an upper limit of a sum of the predetermined numbers of time units for the one or more path objects to be placed, and
 the placement module sets a value within the upper limit specified by the player to be the predetermined number and places the one or more path objects.

5. The game providing device according to claim 1, wherein
 the path is constituted by multiple first path elements each connecting a starting point and an ending point, and a second path element connecting two of the first path elements,
 the path object functions as the second path element on the basis of advancement of the time unit,
 the goal point is set to any one of the ending points of the first path elements, and
 the predetermined rule is a rule for a ghost leg lottery.

6. The game providing device according to claim 1, wherein
 the screen output module outputs the game screen on which the moving object is placed at a start point on the path and which contains the path area in which a goal point on the path is displayed, and
 the moving module starts advancing the time unit according to an instruction from the player after placing the path object according to an instruction from the player.

7. The game providing device according to claim 1, wherein the game is a game in which one or more moving objects are to be brought to the goal points set for the moving objects, respectively.

8. The game providing device according to claim 7, wherein the moving objects include different types of moving objects that move for different distances each time the time unit advances.

9. The game providing device according to claim 7, wherein the path object blocks a predetermined type of moving object among the moving object while functioning as part of the path.

10. The game providing device according to claim 1, wherein the path object ceases to function as part of the path after the moving object passes therethrough.

11. The game providing device according to claim 1, wherein
the game is a game in which the moving object is to be brought to the goal point passing through a predetermined point on the path, and
the determination module determines whether the moving object has passed the predetermined point before reaching the goal point.

12. A system that provides a player operating a terminal device connected via a communication network with a game in which a moving object moving along a path according to a predetermined rule is to be brought to a goal point, the system comprising:
one or more processors configured to execute a predetermined program, wherein
the program includes:
a screen output module configured to output a game screen containing a path area in which the path is formed to the terminal device;
a placement module configured to place a path object that functions as part of the path on the basis of advancement of a time unit into the path area according to an instruction from the player operating the terminal device;
a moving module configured to advance the time unit to move the moving object along the path according to the predetermined rule; and
a determination module configured to determine whether the moving object has reached the goal point, and
the path object functions as part of the path when a predetermined number of time units advance.

13. A non-transitory computer-readable storage medium storing a program causing a computer to function as a game providing device that provides a player with a game in which a moving object moving along a path according to a predetermined rule is to be brought to a goal point, the program comprising:
a screen output module configured to output a game screen containing a path area in which the path is formed;
a placement module configured to place a path object that functions as part of the path on the basis of advancement of a time unit into the path area according to an instruction from the player;
a moving module configured to advance the time unit to move the moving object along the path according to the predetermined rule; and
a determination module configured to determine whether the moving object has reached the goal point, and
the path object functions as part of the path when a predetermined number of time units advance.

* * * * *